US012001695B2

(12) United States Patent
Pallipadi et al.

(10) Patent No.: US 12,001,695 B2
(45) Date of Patent: Jun. 4, 2024

(54) PROVIDING A DISTRIBUTED AND REPLICATED DATA STORE IN A HETEROGENEOUS CLUSTER

(71) Applicant: Cohesity, Inc., San Jose, CA (US)

(72) Inventors: Venkatesh Pallipadi, Campbell, CA (US); Sachin Jain, Fremont, CA (US); Deepak Ojha, Fremont, CA (US); Apurv Gupta, Bengaluru (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 18/082,516

(22) Filed: Dec. 15, 2022

(65) Prior Publication Data

US 2023/0229323 A1    Jul. 20, 2023

Related U.S. Application Data

(63) Continuation of application No. 16/805,232, filed on Feb. 28, 2020, now Pat. No. 11,556,254.

(51) Int. Cl.
*G06F 3/06* (2006.01)
(52) U.S. Cl.
CPC .......... *G06F 3/0631* (2013.01); *G06F 3/0604* (2013.01); *G06F 3/065* (2013.01); *G06F 3/067* (2013.01)
(58) Field of Classification Search
None
See application file for complete search history.

(56) References Cited

U.S. PATENT DOCUMENTS

| 10,908,997 | B1 | 2/2021 | Vankamamidi | |
|---|---|---|---|---|
| 2009/0320041 | A1 | 12/2009 | Noguchi | |
| 2015/0378613 | A1* | 12/2015 | Koseki | G06F 3/0635 |
| | | | | 711/103 |
| 2015/0379009 | A1* | 12/2015 | Reddy | G06F 16/951 |
| | | | | 707/747 |

(Continued)

OTHER PUBLICATIONS

Satyavarapu, Krishna, Apache Cassandra Rapid Node Replacement Using Snapshots, PureStorage Blog Home, Purely Technical, Jul. 30, 2019 (Year: 2019).*

(Continued)

*Primary Examiner* — Prasith Thammavong
*Assistant Examiner* — Edmund H Kwong
(74) *Attorney, Agent, or Firm* — Shumaker & Sieffert, P.A.

(57) ABSTRACT

A plurality of logical storage segments of storage drives of a plurality of storage nodes are identified. At least one of the storage nodes includes at least a first logical storage segment and a second logical storage segment included in the plurality of logical storage segments. A distributed and replicated data store using a portion of the plurality of logical storage segments that excludes at least the second logical storage segment is provided. An available storage capacity metric associated with the plurality of logical storage segments is determined to meet a first threshold. In response to the determination that the available storage capacity metric meets the first threshold, at least the second logical storage segment is dynamically deployed for use in providing the distributed and replicated data store in a manner that increases a storage capacity of the data store while maintaining a fault tolerance policy of the distributed and replicated data store.

20 Claims, 7 Drawing Sheets

(56) References Cited

U.S. PATENT DOCUMENTS

2017/0269862 A1    9/2017  Agombar
2019/0303021 A1*  10/2019  Favre-Felix .......... G06F 3/0617
2020/0004723 A1*   1/2020  Ben Dayan ......... G06F 11/1076
2020/0026446 A1*   1/2020  Jawahar ................. G06F 3/065

OTHER PUBLICATIONS

Max, The Total Newbie's Guide to Cassandra, https://blog.insightdatascience.com/the-total-newbies-guide-to-cassandra-e63bce0316a4, Sep. 6, 2017. (Year: 2017).*

Holowczak, Holowczak.com Introduction to NoSQL Databases, https://holowczak.com/nosql-key-value-column-stores/3/, Nov. 2013 (Year: 2013).

* cited by examiner

PROVIDING A DISTRIBUTED AND REPLICATED DATA STORE IN A HETEROGENEOUS CLUSTER

CROSS REFERENCE TO OTHER APPLICATIONS

This application is a continuation of U.S. patent application Ser. No. 16/805,232 entitled PROVIDING A DISTRIBUTED AND REPLICATED DATA STORE IN A HETEROGENEOUS CLUSTER filed Feb. 28, 2020 which is incorporated herein by reference for all purposes.

BACKGROUND OF THE INVENTION

A storage system may be comprised of a plurality of storage nodes. The storage system may back up data associated with a primary system. The backed up data may be distributed across the storage system. One or more copies of the data may be stored across the storage node.

BRIEF DESCRIPTION OF THE DRAWINGS

Various embodiments of the invention are disclosed in the following detailed description and the accompanying drawings.

DETAILED DESCRIPTION

Figure 1:
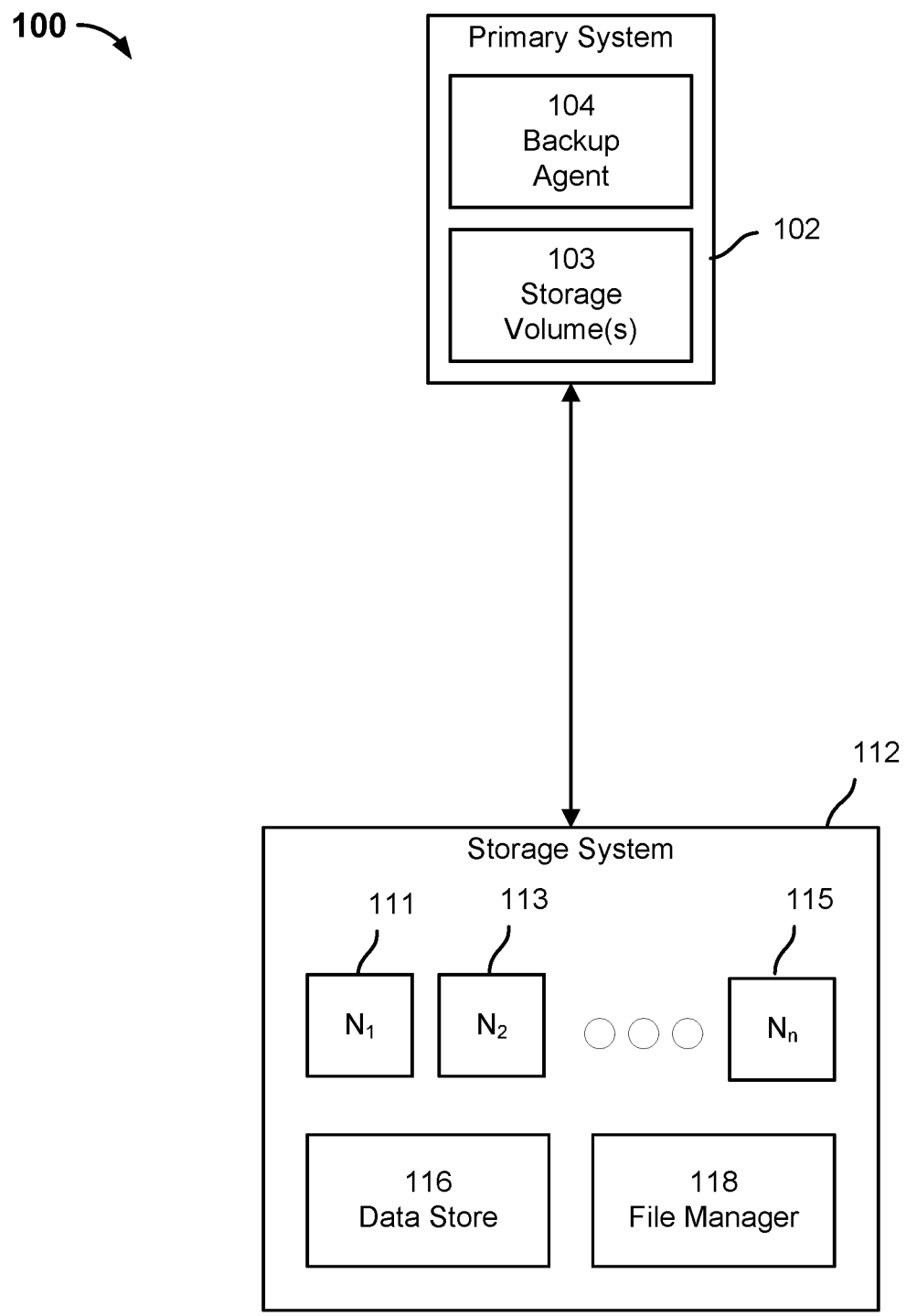
FIG. 1 is a block diagram illustrating an embodiment of a system for providing a heterogeneous storage system.

A primary system is a computing system that generates and stores file system data. The file system data is backed up to a storage system. The storage system is comprised of a plurality of storage nodes. Each storage node has a corresponding processor, corresponding memory, and corresponding storage. The file system data may be stored using key-value pairs. The key-value pairs may be hashed into a plurality of buckets. For example, a first bucket may be comprised of a first 100 key-value pairs, a second bucket may be comprised of a second 100 key-value pairs, . . . , and an nth bucket may be comprised of a nth 100 key-value pairs. In some embodiments, the number of key-value pairs included in each bucket is the same. In some embodiments, the number of key-value pairs included in some of the buckets is the same and the number of key-value pairs include in at least one bucket is different than the other buckets. In some embodiments, the number of key-value pairs included in each bucket is different.

The storage system is configured to be fault tolerant. Fault tolerance means that the storage system is able to provide access (e.g., read or write) to the value associated with a key-value pair in the event one or more storage nodes of the storage system are unavailable. The storage system implements a distributed and replicated data store to be fault tolerant. The storage system implements a fault tolerance policy for the distributed and replicated data store. The fault tolerance policy may indicate that a threshold number X copies of a key-value pair are required to be stored by the storage system. For example, if X=3, a first copy of the key-value pairs included in a first bucket may be stored on a first storage node, a second copy of the key-value pairs included in the first bucket may be stored on a second storage node, and a third copy of the key-value pairs included in the first bucket may be stored on a third storage node. The fault tolerance policy may indicate that a threshold number Y copies of a bucket are required to be stored by the storage system. For example, if Y=3, a first copy of a first bucket comprising a plurality of key-value pairs may be stored on a first storage node, a second copy of the first bucket comprising the plurality of key-value pairs may be stored on a second storage node, and a third copy of the first bucket comprising the plurality of key-value pairs may be stored on a third storage node.

Some storage systems may implement a homogenous configuration, that is, each storage node of a storage system has the same throughput (e.g., same processing power, the same memory capabilities, and the same storage capabilities). However, such storage systems are limited because they do not adapt to improvements in computer capabilities over the life span of the storage system. These storage systems may be upgraded over time, but to maintain as a homogenous configuration, each storage node of the storage system is replaced with a new storage node having the same performance capabilities.

Some storage systems may implement a heterogeneous configuration, that is, at least one storage node of the storage system has different performance capabilities than the other storage nodes of the storage system. For example, a storage system may have initially have a homogenous configuration, but an additional storage node with different performance capabilities than the storage nodes included in the homogenous configuration, is added to the storage system. The key-value pairs included in the distributed and replicated data store may be rebalanced so that the new storage node stores some of the key-value pairs included in the distributed and replicated data store. In another example, an existing storage node may be replaced with a new storage node having different performance capabilities than the storage nodes included in the storage system. In another example, the storage system may be initially comprised of storage nodes having the same or different performance capabilities.

Using a heterogeneous configuration for a storage system to implement a distributed and replicated data store may introduce performance issues for the storage system. For example, storage nodes with different performance capabilities may have different latencies when trying to access key-value pairs of the distributed and replicated data store. This may cause bottlenecks to arise when the storage system is handling a plurality of concurrent requests.

Techniques disclosed herein may be implemented to improve heterogeneous storage system performance and reduce latencies associated the heterogeneous storage system. In some embodiments, the throughput (e.g., combination of CPU, memory, speed of storage, networking capabilities) of each storage node is the same, but the storage capabilities of at least one storage node is different than the other storage nodes. The storage devices of a storage node may be allocated into one or more logical storage segments. In some embodiments, the storage node with the smallest storage capability is identified. The storage size of the identified storage node may be determined to be the size of a logical storage segment for the plurality of storage nodes of the heterogeneous storage system. A storage node may be comprised of a plurality logical storage segments in the event the storage capacity of a storage node is greater than a multiple of the smallest storage capacity. For example, a first storage node may have a storage capacity of 1 TB, a second storage node may have a storage capacity of 1.5 TB, and a third storage node may have a storage capacity of 2.25 TB. In this example, the smallest storage capacity is 1 TB. The first storage node is comprised of a single logical storage segment. The second storage node is also comprised of a single logical storage segment, even though its storage capacity is 1.5 TB. The extra 0.5 TB of storage capacity may be used for other purposes. The third storage node is comprised of two logical storage segments, but has an extra 0.25 TB of storage capacity that may be used for other purposes. In this scenario, the unused storage capacity for the storage system is 0.75 TB. In some embodiments, the logical storage size corresponds to a size that reduces the amount of unused storage capacity for the plurality of storage nodes within an unused storage capacity threshold. In the above example, the second storage node has 0.5 TB of extra storage capacity and the second storage node has 0.25 TB of extra storage capacity. The logical storage segment size may be selected to be 0.75 TB, which would cause the first storage node to have a single logical storage segment of 0.75 TB and 0.25 TB unused storage capacity, the second storage node to have a first logical storage segment of 0.75 TB and a second logical storage segment of 0.75 TB, and the third storage node to have a first logical storage segment of 0.75 TB, a second logical storage segment of 0.75 TB, and a third logical storage segment of 0.75 TB. In this scenario, the unused storage capacity for the storage system is 0.25 TB. In some embodiments, the size of the logical storage segment for the plurality of storage nodes is determined based on using the smallest storage capacity of a storage node, but in the event the amount of unused storage capacity is greater than an unused storage capacity threshold, then the size of the logical storage segment for the plurality of storage nodes is adjusted to the size that reduces the amount of unused storage capacity for the plurality of storage nodes within the unused storage capacity threshold. In some embodiments, the logical storage size corresponds to a size that reduces the amount of unused storage capacity for the plurality of storage nodes regardless of whether the unused storage capacity is greater than an unused storage capacity threshold.

In some embodiments, the throughput (e.g., combination of CPU, memory, speed of storage, networking capabilities) of at least one storage node is different than the other storage nodes. The logical storage segment size for each of the storage node(s) is the same as when the throughput is the same for each of the storage nodes, but the key-value pairs and buckets stored by a storage node is proportional to the throughput of a storage node. For example, a first storage node having a throughput that is less than the throughput of a second storage node may store fewer key-value pairs and buckets than the second storage node. This may reduce latencies associated with the heterogeneous storage system because first storage node having less throughput than the second storage node is not being used as much to service file operations (read/write) as the second storage node. In the event a storage node has more throughput than other storage nodes of the heterogeneous storage system, the storage node having higher throughput may be weighted higher in a load balancing scheme that assigns key-value pairs and buckets to a storage node. That is, the storage node having higher throughput will store more key-value pairs and buckets than storage nodes having less throughput.

A circular ordering for the plurality of logical storage segments is determined. The storage system may operate in a performance mode in which a logical storage segment from each of the storage nodes is included in the circular ordering. In the event a storage node includes a plurality of logical storage segments, one of the plurality of logical storage segments is selected and included in the circular ordering and the one or more non-selected logical storage segments of the storage node are excluded from the circular ordering. This may reduce latency and improve the performance of the storage system because each of the storage nodes has the same throughput or a throughput within a throughput range. The plurality of logical storage segments that store copies of a bucket comprised of a plurality of key-value pairs are selected based on the circular ordering and the fault tolerance policy. The fault tolerance policy may require that copies of buckets are stored in a threshold number of adjacent logical storage segments. For example, the fault tolerance policy may indicate that three copies of a key-value pair are to be stored by the storage system. The copies of the key-value pair may be stored in three logical storage segments that are determined to be adjacent based on the determined circular ordering.

The storage system may perform a plurality of backups of the primary system. The file system data may be stored using key-value pairs. The key-value pairs may be hashed into a plurality of buckets. Buckets of key-value pairs may be distributed across the plurality of logical storage segments. At some point in time, an available storage capacity metric associated with the logical storage segments meets a first threshold (e.g., 80% of a logical storage segment is used, 80% of the total storage capacity of the online logical storage segments is used, 80% of the total storage capacity of all of the included logical storage segments (online and offline) is used). In the event the available storage capacity metric associated with the logical storage segments meets the first threshold, one or more unused logical storage segments (e.g., the non-selected logical storage segments) may be deployed to increase the storage capacity of the storage system.

In "space mode", some or all of the logical storage segments that were not selected to be used in performance mode are included in the circular ordering. This may introduce latencies in at least one of the storage nodes since a processor of the at least one of the storage nodes is responsible for providing access (e.g., read/write) to multiple logical storage segments while some of the processors of the storage nodes are responsible for providing access to a single logical storage segment. For example, in performance node a storage node with a first logical storage segment may be responsible for providing access to key-value pairs stored in 100 buckets. In space mode, the storage node with the first logical storage segment may also include as second logical storage segment, which may store an additional 100 buckets of key-value pairs. The storage node is not only responsible for providing access to key value pairs stored in 100 buckets that are stored in the first logical storage segment, but also responsible for providing access to key value pairs stored in 100 buckets that are stored in the second logical storage segment. The processor of the storage node has a finite amount of resources to provide access. In space mode, the finite amount of resources is split between providing access to the first logical storage segment and the second logical storage segment.

However, offloading storage of buckets comprising key-value pairs from a logical storage segment to one of the one or more added logical storage segments may improve a performance of the storage node associated with the logical storage segment because the storage node is responsible for providing access to a smaller number of buckets comprising key-value pairs. The storage node may receive fewer requests to provide access to the key-value pairs stored in the logical storage segment and as a result, may have more resources available to service requests.

The one or more unused logical storage segments, i.e., the non-selected logical storage segments excluded from performance mode, may be deployed in a manner that maintains the fault tolerance policy associated with the storage system. The fault tolerance policy may require that copies of a key-value pair cannot be stored in logical storage segments that are located on the same storage node. The fault tolerance policy may require that copies of a bucket cannot be stored in logical storage segments that are located on the same storage node. For example, a storage node may include two logical storage segments. The fault tolerance policy may prevent the first logical storage segment of the storage node from storing a first copy of the bucket and the second logical storage segment of the storage node from storing a second copy of the bucket. In this example, if two copies of the bucket were permitted to be stored in different logical storage segments in the same storage node, and in the event X=2 and the storage node went offline, then the key-value pairs included in the bucket would not be accessible. Thus, the storage system would not be fault tolerant.

In space mode, the circular ordering for the plurality of logical storage segments is adjusted to accommodate the one or more added logical storage segments (e.g., the one or more logical storage segments that were not selected in performance mode). The logical storage segments of a single storage node may be located in the circular ordering such that they are not adjacent to each other. The logical storage segments of a single storage node may be located in the circular ordering based on the fault tolerance policy. For example, in the event Y=3, there may be at least three logical storage segments in the circular ordering separating every pair of logical storage segments of the plurality of logical storage segments of a single storage node. In this example, the three (because Y=3) copies of each bucket will be stored in three adjacent logical storage segments according to the circular ordering; because according to the fault tolerance policy, each pair of logical storage segments of the same storage node must be separated by at least three nodes in the circular ordering, none of the bucket's key-value pairs will be stored in more than one logical segment of the same storage node.

After the adjusted circular ordering is determined, the buckets of the distributed and replicated data store may be rebalanced to maintain the fault tolerance policy of the storage system. For example, prior to the circular ordering being adjusted, a first copy of a first bucket may be stored in a first logical storage segment and a second copy of the first bucket may be stored in a second logical storage segment where the first logical storage segment and the second logical storage segment are adjacent to each other. After the adjusted circular ordering is determined, the first logical storage segment and the second logical storage segment may no longer be adjacent to each other. The first copy of the first bucket stored in the first logical storage segment may be redistributed to a third logical storage segment that is adjacent, according to the adjusted circular ordering, to the second logical storage segment or the second copy of the first bucket stored in the second logical storage segment may be redistributed to a fourth logical storage segment that is adjacent, according to the adjusted circular ordering, to the first logical storage segment. A plan to rebalance the buckets of the distributed and replicated data store may be determined prior to adjusting the circular ordering of the logical storage segments. Buckets may be balanced in a manner that minimizes the number of buckets that are redistributed. In the event a request for the value of a key-value pair is received during a rebalancing of the buckets, the request may be fulfilled by a storage node that stores a copy of the key-value pair and the copy of the key-value pair is not scheduled to be moved to another storage node.

At some point in time, one or more storage nodes may be added to the storage system. The storage system may switch from a "space mode" back to a "performance mode." The circular ordering for the plurality of logical storage segments may be determined in a manner that complies with the fault tolerance policy and minimizes the number of buckets that need to be redistributed. The plurality of buckets may be further rebalanced such that the logical storage segments of the one or more added storage nodes stores a portion of the distributed and replicated data store.

FIG. 1 is a block diagram illustrating an embodiment of a system for providing a heterogeneous storage system. In the example shown, system 100 is comprised of primary system 102 and storage system 112.

Primary system 102 is a computing system that stores file system data. The file system data may include a plurality of files (e.g., content files, text files, etc.) and metadata associated with the plurality of files. The file system data is stored in one or more storage volumes 103. Primary system 102 may be comprised of one or more servers, one or more computing devices, one or more storage devices, and/or a combination thereof. Primary system 102 may be configured to send a backup snapshot of file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102.

Backup agent 104 may be configured to cause primary system 102 to perform a backup snapshot (e.g., a full backup snapshot or incremental backup snapshot). A full backup snapshot includes all of the file system data of primary system 102 at a particular moment in time. An incremental backup snapshot includes all of the file system data of primary system 102 that was not previously included in a previous backup snapshot. In some embodiments, backup agent 104 is optional. In some embodiments, primary system 102 includes a backup function to perform a backup snapshot without the need for backup agent 104.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and configured to store the data associated with the backup snapshot across the storage cluster in distributed and replicated data store 116. Each storage node of the plurality of storage nodes 111, 113, 115 may store a portion of the distributed and replicated data store 116. Storage system 112 may be a cloud instantiation of a storage system. A configuration of cloud instantiation of storage system 112 may be a replica of storage system 112. For example, storage system 112 may be comprised of three storage nodes, each storage node with a storage capacity of 10 TB. A cloud instantiation of storage system 112 may be comprised of three virtual nodes, each virtual node with a storage capacity of 10 TB. In other embodiments, a cloud instantiation of storage system 112 may have more storage capacity than storage system 112. In other embodiments, a cloud instantiation of storage system 112 may have less storage capacity than storage system 112.

The file system data may be stored using key-value pairs. The key-value pairs may be hashed into a plurality of buckets. In some embodiments, the number of key-value pairs included in each bucket is the same. In some embodiments, the number of key-value pairs included in some of the buckets is the same and the number of key-value pairs include in at least one bucket is different than the other buckets. In some embodiments, the number of key-value pairs included in each bucket is different.

Storage system 112 is configured to be fault tolerant. Fault tolerance means that storage system 112 is able to provide access (e.g., read or write) to the value associated with a key-value pair in the event one or more storage nodes 111, 113, 115 of storage system 112 are unavailable. Storage system 112 implements a distributed and replicated data store to be fault tolerant, that is, buckets of key-value pairs are distributed and replicated across storage nodes 111, 113, 115.

Storage system 112 implements a fault tolerance policy for distributed and replicated data store 116. The fault tolerance policy may indicate that X copies of a key-value pair are required to be stored by storage system 112. Thus, the storage system may store X copies of a bucket. For example, if X=3, a first copy of the key-value pairs included in a first bucket may be stored on a first storage node, a second copy of the key-value pairs included in the first bucket may be stored on a second storage node, and a third copy of the key-value pairs included in the first bucket may be stored on a third storage node. The fault tolerance policy may indicate that a threshold number Y copies of a bucket are required to be stored by the storage system. For example, if Y=3, a first copy of a first bucket comprising a plurality of key-value pairs may be stored on a first storage node, a second copy of the first bucket comprising the plurality of key-value pairs may be stored on a second storage node, and a third copy of the first bucket comprising the plurality of key-value pairs may be stored on a third storage node.

File manager 118 may select an initial logical storage segment to store a bucket comprised of a plurality of key-value pairs. A fault tolerance policy may indicate the number of copies of the key-value pairs included in a bucket that are to be maintained by the storage system. File manager 118 may use a circular ordering to determine which logical storage segments of a heterogeneous storage system are to store an initial copy and one or more additional copies of key-value pairs included in a bucket. File manager 118 may determine which logical storage segments are adjacent based on the circular ordering for the plurality of logical storage segments. File manager 118 may select the non-initial logical storage segments to store a copy of a bucket based on an available storage capacity of the non-initial logical storage segments. In the event the available storage capacity metric associated with one of the logical storage segments meets an available storage capacity threshold, file manager 118 may deploy one or more unused logical storage segments (e.g., the excluded non-selected logical storage segments) to increase the storage capacity of the storage system. File manager 118 may adjust the circular ordering based on the one or more added logical storage segments (e.g., the one or more logical storage segments that were not selected in performance mode) such that the adjusted circular ordering is in compliance with the fault tolerance policy (e.g., a bucket of key-value pairs are stored on adjacent logical storage segments, a certain number of copies of the key-value pairs are stored in a certain number of adjacent logical storage segments).

After the adjusted circular ordering is determined, file manager 118 may rebalance the buckets of the distributed and replicated data store to maintain the fault tolerance policy of the storage system. File manager 118 may select buckets to redistribute in a manner that minimizes the number of buckets that are redistributed.

In some embodiments, storage system 112 implements a performance mode. In some embodiments, storage system 112 implements a space mode. In some embodiments, storage system 112 may switch from performance mode to a space mode in the event a threshold number of storage nodes go offline. Storage system 112 may determine a new circular ordering for space mode and rebalance the distributed and replicated data store according to the new circular ordering. Storage system 112 may determine the new circular ordering for space mode before storage system 112 switches from performance mode to space mode. Storage system 112 may determine how to rebalance the distributed and replicated data store before storage system 112 switches from performance mode to space mode. Storage system 112 may determine how to rebalance and move one or more buckets of key-value pairs in the event any combination of storage nodes go offline prior to any of the storage nodes going offline, that is, storage system 112 is prepared to maintain the distributed and replicated data store according to the fault tolerance policy for any failure scenario.

In some embodiments, storage system 112 determines whether to switch from performance mode to space mode based on any storage node failure scenario. For example, a first storage node going offline may not cause the available storage capacity metric associated with the logical storage segments to meet the first threshold, however, the first storage node and a second storage node going offline may cause the available storage capacity metric associated with the logical storage segments to meet the first threshold. In the event any combination of the storage nodes go offline, storage system 112 determines whether it needs to switch from performance mode to storage mode, and if it determines that it needs to switch, storage system 112 switches from performance mode to storage mode.

In some embodiments, storage system 112 may switch from space mode to a performance mode in the event one or more storage nodes are added to storage system 112. Storage system 112 may determine a new circular ordering for performance mode and rebalance the distributed and replicated data store according to the new circular ordering. Storage system 112 may determine the new circular ordering for space mode before storage system 112 switches from space mode to performance mode. Storage system 112 may determine how to rebalance the distributed and replicated data store before storage system 112 switches from space mode to performance mode. Storage system 112 may determine how to rebalance and move one or more buckets of key-value pairs in the event any combination of storage nodes are added to the storage system prior to the storage nodes being added, that is, storage system 112 is prepared to maintain the distributed and replicated data store according to the fault tolerance policy for any node addition scenario.

Figure 2:
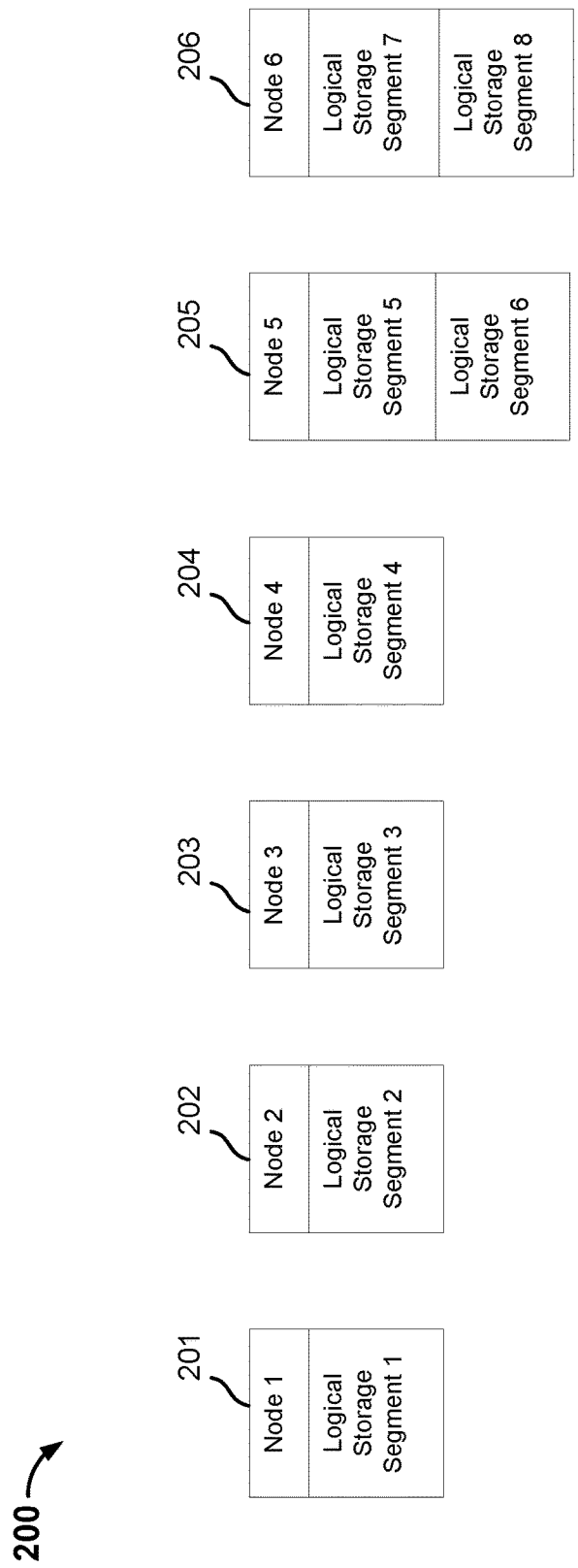
FIG. 2 is a block diagram illustrating an embodiment of a heterogeneous storage system.

FIG. 2 is a block diagram illustrating an embodiment of a heterogeneous storage system. In the example shown, the heterogeneous storage system 200 may be implemented by a storage system, such as storage system 112.

In the example shown, heterogeneous storage system 200 includes storage nodes 201, 202, 203, 204, 205, 206. In some embodiments, storage nodes 201, 202, 203, 204, 205, 206 include a corresponding processor that has the same processing power. In some embodiments, storage nodes 201, 202, 203, 204, 205, 206 include a corresponding processor that has a different processing power. In some embodiments, some of the storage nodes 201, 202, 203, 204, 205, 206 include a corresponding processor that has the same processing power and some of the storage nodes 201, 202, 203, 204, 205, 206 include a corresponding processor that has a different processing power. Heterogeneous storage system 200 includes at least one storage node with a different storage capacity than the other storage nodes of heterogeneous storage system 200. Although heterogeneous storage system 200 includes six storage nodes, heterogeneous storage system 200 may be comprised of n storage nodes.

A storage device of a storage node may be divided into one or more logical storage segments. In some embodiments, the storage node of heterogeneous storage system 200 with the smallest storage capability is identified. The storage size of the identified storage node is determined to be the size of a logical storage segment for the plurality of storage nodes of heterogeneous storage system 200. A storage node may be comprised of a plurality logical storage segments in the event the storage capacity of a storage node is greater than a multiple of the smallest storage capacity. In some embodiments, the logical storage size corresponds to a size that reduces the amount of unused storage capacity for the plurality of storage nodes within an unused storage capacity threshold.

In the example shown, storage node 201 is identified as the storage node with the smallest storage capacity of the plurality of storage nodes of heterogeneous storage system 200. Storage nodes 205, 206 include two logical storage segments because their corresponding storage capacity is greater than a multiple of the storage capacity of storage node 201. For example, the storage capacity of storage node 205 and storage node 206 is at least twice the size of the storage capacity of storage node 201, but less than three times the size of the storage capacity of storage node 201. Storage node 205 includes logical storage segment 5 and logical storage segment 6. Storage node 206 includes logical storage segment 7 and logical storage segment 8.

Storage nodes 202, 203, 204 may have a storage device that has the same storage capacity as the storage device of storage node 201 or a storage capacity that is less than a multiple of the storage capacity of the storage device of storage node 201.

Figure 3A:
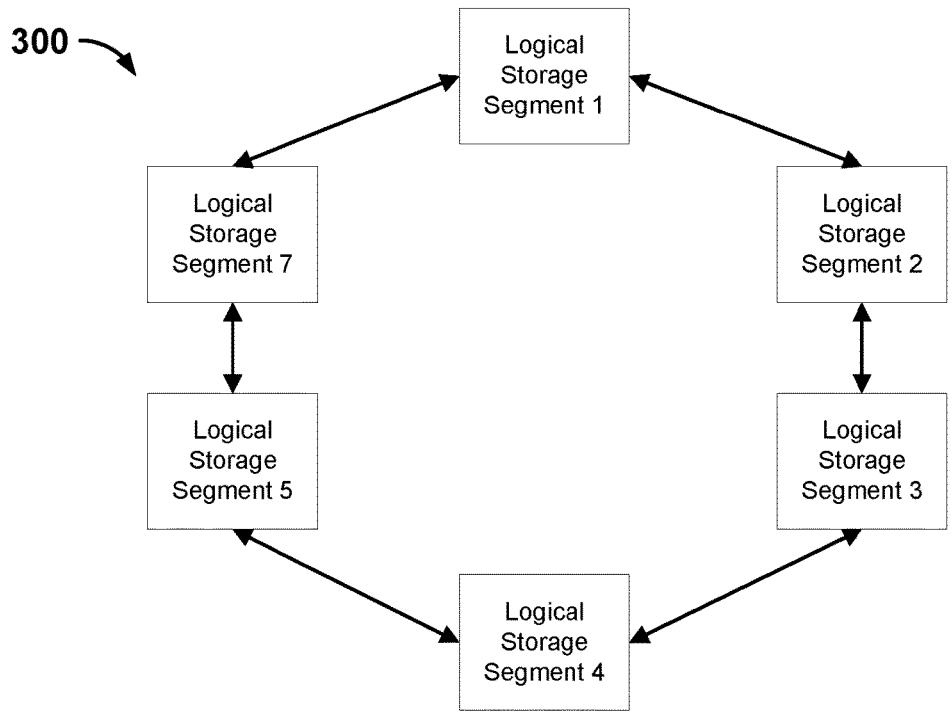
FIG. 3A is a diagram illustrating an embodiment of a circular ordering of logical storage segments.

FIG. 3A is a diagram illustrating an embodiment of a circular ordering of logical storage segments. In the example shown, circular ordering 300 may be implemented by a storage system, such as storage system 112.

A storage system may implement a performance mode to store a plurality of buckets comprised of a plurality of key-value pairs. In a performance mode, a logical storage segment of a storage node is included in a circular ordering of logical storage segments. In performance mode, in the event a storage node includes a plurality logical storage segments, one of the logical storage segments of the storage node is selected and the one or more other logical storage segments of the storage node are excluded from the circular ordering of logical storage segments.

FIG. 3A depicts an example of the logical storage segments from FIG. 2 being arranged in a circular ordering of logical storage segments. Storage node 205 and storage node 206 both include two logical storage segments. One logical storage segment is selected from storage node 205 and one logical storage segment is selected from storage node 206. Although FIG. 3A depicts logical storage segment 5 and logical storage segment 7 as being selected, logical storage segment 6 may have been selected in place of logical storage segment 5, and logical storage segment 8 may have been selected in place of logical storage segment 7.

Circular ordering 300 is comprised of logical storage segment 1, logical storage segment 2, logical storage segment 3, logical storage segment 4, logical storage segment 5, and logical storage segment 7. Circular ordering 300 may dictate the plurality of logical storage segments on which key-value pairs of a bucket are stored.

A file manager of a storage system may select an initial logical storage segment to store a bucket comprised of a plurality of key-value pairs. The file manager may select logical storage segment 1, logical storage segment 2, logical storage segment 3, logical storage segment 4, logical storage segment 5, or logical storage segment 7 as the initial logical storage segment. A fault tolerance policy may indicate the number of copies of the key-value pairs included in a bucket that are to be maintained by the storage system. A fault tolerance policy may indicate the number of copies of buckets comprising key-value pairs that are to be maintained by the storage system. Circular ordering 300 (or other circular orderings) may be used to determine which logical storage segments of a heterogeneous storage system are to store copies of key-value pairs included in a bucket.

For example, suppose the fault tolerance policy of a storage system indicates that three copies of key-value pairs are to be maintained by the storage system. The copies of a key-value pair are to be stored in adjacent logical storage segments. The file manager may determine which logical storage segments are adjacent based on the circular ordering for the plurality of logical storage segments. A file manager of the storage system may select logical storage system 1 as the initial logical storage segment to store a first copy of a first bucket comprised of a plurality of key-value pairs. The file manager of the storage system may inspect circular ordering 300 to determine that logical storage segment 2 is to store a second copy of the first bucket and logical storage segment 3 is to store a third copy of the first bucket. In other embodiments, the file manager of the storage system inspects circular ordering 300 to determine that logical storage segment 7 is to store a second copy of the first bucket and logical storage segment 5 is to store a third copy of the first bucket. In other embodiments, the file manager of the storage system inspects circular ordering 300 to determine that logical storage segment 7 is to store a second copy of the first bucket and logical storage segment 2 is to store a third copy of the first bucket. The non-initial logical storage segments selected to store a copy of a bucket may be based on an available storage capacity of the non-initial logical storage segments.

Figure 3B:
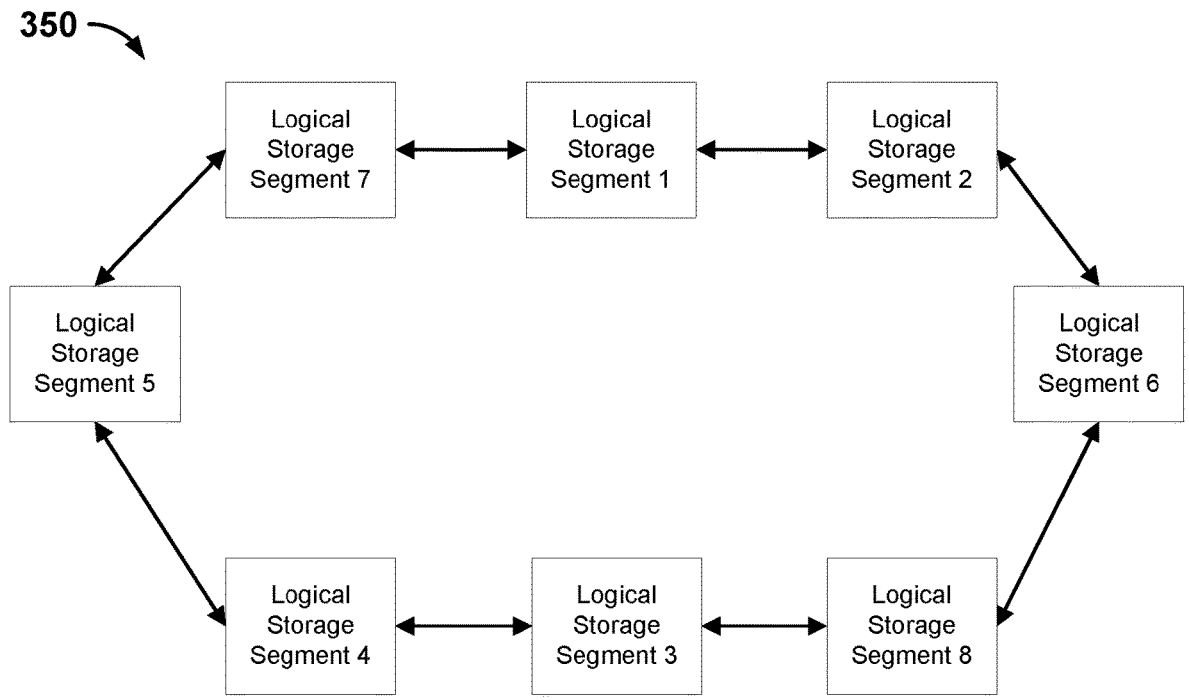
FIG. 3B is a diagram illustrating an embodiment of a circular ordering of logical storage segments.

FIG. 3B is a diagram illustrating an embodiment of a circular ordering of logical storage segments. In the example shown, circular ordering 350 may be implemented by a storage system, such as storage system 112. Circular ordering 350 may correspond to a space mode of a storage system.

At some point in time, an available storage capacity metric associated with one of the logical storage segments 1, 2, 3, 4, 5, 7 of FIG. 3A meets a first threshold (e.g., 80% of the logical storage segment is used). For example, the available storage capacity metric may be a percentage of a single logical storage segment or all of the logical storage segments that is used. The available storage capacity metric may be a total amount of data stored by a single logical storage segment or all of the logical storage segments in combination. In the event the available storage capacity metric associated with one of the logical storage segments 1, 2, 3, 4, 5, 7 meets the first threshold, a file manager of the storage system may deploy some or all of one or more unused logical storage segments (e.g., the excluded non-selected logical storage segments) to increase the storage capacity of the storage system. In a space mode, some or all of the unused logical storage segments are included in the circular ordering to reduce the storage burden of the logical storage segments already included in the circular ordering. As seen in FIG. 2, logical storage segments 6, 8 were excluded from circular ordering 300. As seen in FIG. 3B, logical storage segments 6, 8 are included in circular ordering 350. In this example, all of the unused logical storage segments are included in the circular ordering. In the event some of the unused logical storage segments are included in the circular ordering, a storage capacity of the used logical storage segments is monitored. In the event the storage capacity of the used logical storage segments meets the first threshold, the remaining unused logical storage segments may be added to the circular ordering and placed in a manner that is consistent with the fault tolerance policy.

The one or more added logical storage segments may be deployed in a manner that maintains the fault tolerance policy associated with the storage system. The fault tolerance policy may require that copies of a key-value pair cannot be stored in logical storage segments that are located on the same storage node. The fault tolerance policy may require that copies of a copies of a bucket, cannot be stored in logical storage segments that are located on the same storage node. For example, storage nodes 205, 206 of FIG. 2 each include two logical storage segments. The fault tolerance policy may prevent logical storage segment 5 of storage node 205 from storing a first copy of the bucket and logical storage segment 6 of storage node 205 from storing a second copy of the bucket in order to avoid loss of fault tolerance if storage node 205 goes offline.

The circular ordering for the plurality of logical storage segments is adjusted to accommodate the one or more previously unused (newly deployed) logical storage segments. The logical storage segments of a single storage node may be located in the circular ordering such that they are not adjacent to each other. The logical storage segments of a single storage node may be located in the circular ordering based on the fault tolerance policy. For example, in the event X=3 or Y=3, there may be at least three logical storage segments in the circular ordering separating the plurality of logical storage segments of a single storage node.

In the example shown in FIG. 3B, logical storage segments 7, 1, 2 separate logical storage segment 5 and logical storage segment 6 of storage node 205. Logical segments 1, 2, 6 separate logical storage segment 7 and logical storage segment 8 of storage node 206. Logical storage segments of a storage node having a single logical storage segment may be located between logical storage segments associated with storage nodes having a plurality of logical storage segments.

After the adjusted circular ordering is determined, the buckets of the distributed and replicated data store may be rebalanced to maintain the fault tolerance policy of the storage system. A file manager of the storage system may select buckets to redistribute in a manner that minimizes the number of buckets that are redistributed. For example, in performance mode, a first copy of a first bucket may be stored in logical storage segment 1, a second copy of the first bucket may be stored in logical storage segment 2, and a third copy of the first bucket may be stored in logical storage segment 3. FIG. 3A depicts logical storage segments 1, 2, 3 as being adjacent. In space mode, as depicted in FIG. 3B, logical storage segment 1 is adjacent to logical storage segment 2, but logical storage segment 2 is no longer adjacent to logical storage segment 3. As depicted in FIG. 3B, logical storage segment is adjacent to logical storage segment 6. The file manager of the storage system may determine to migrate the third copy of the first bucket from logical storage segment 3 to logical storage segment 6 instead of determining to migrate the first copy of the first bucket from logical storage segment 1 to logical storage segment 6 and determining to migrate the second copy of the first bucket from logical storage segment 2 to logical storage segment 8. The file manager of the storage system may determine to redistribute the buckets in this manner because migrating one copy of the first bucket (e.g., logical storage segment 3 to logical storage segment 6) requires less resources and time than migrating two copies of the first bucket (e.g., logical storage segment 1 to logical storage segment 6, logical storage segment 2 to logical storage segment 8).

Figure 4:
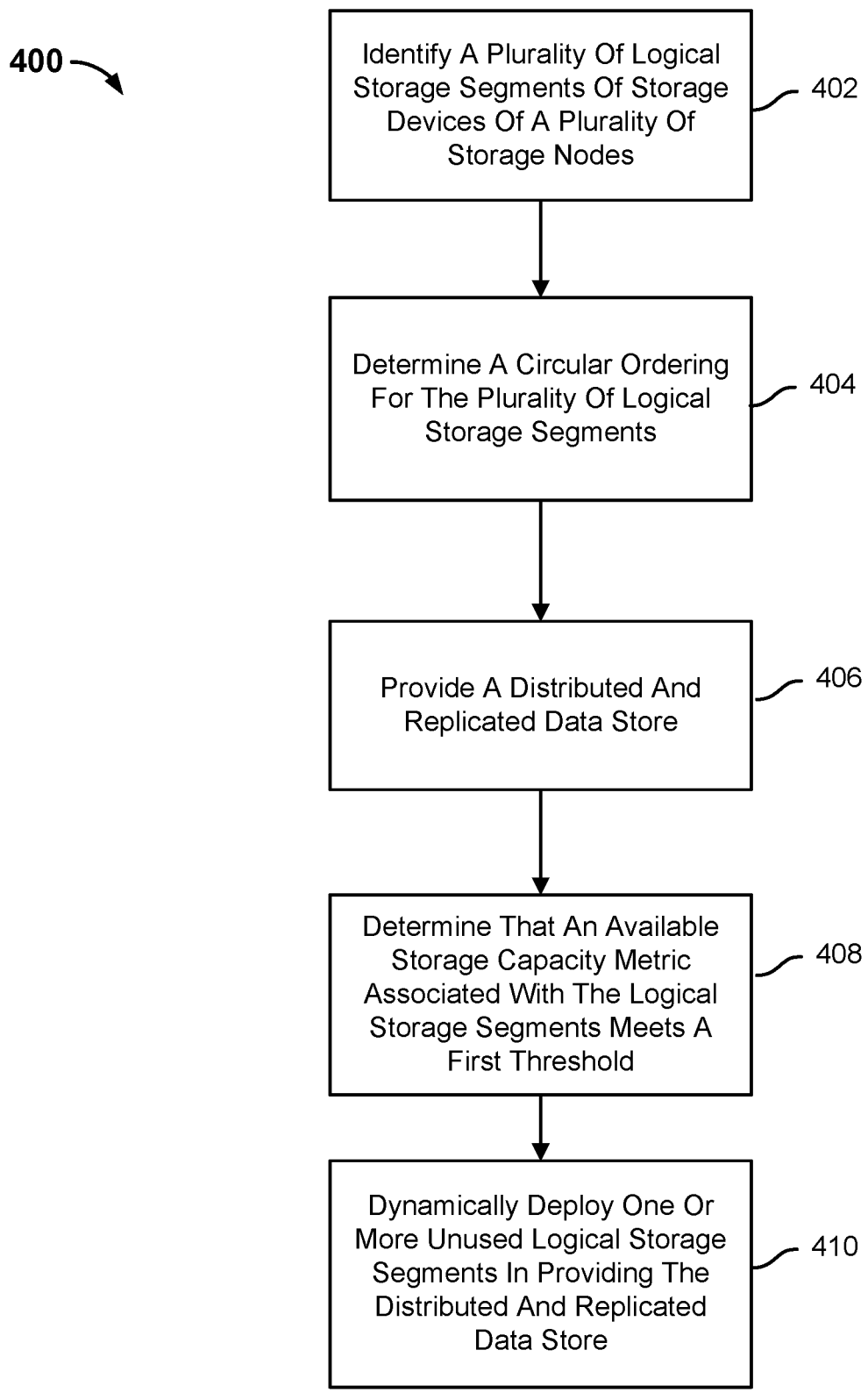
FIG. 4 is a flow chart illustrating an embodiment of a process for providing a heterogeneous storage system.

FIG. 4 is a flow chart illustrating an embodiment of a process for providing a heterogeneous storage system. Process 400 may be implemented by a storage system, such as storage system 112.

At 402, a plurality of logical storage segments of storage devices of a plurality of storage nodes are identified. A storage system is comprised of a plurality of storage nodes. Each storage node includes a corresponding storage device. A storage device may be comprised of one or more logical storage segments. At least one of the storage devices includes at least a first logical storage segment and a second logical storage segment.

At 404, a circular ordering for the plurality of logical storage segments is determined. In some embodiments, the circular ordering for the plurality of logical storage segments is randomly selected. In some embodiments, the circular ordering for the plurality of logical storage segments is selected based on one or more factors, such as size, age, rack/chassis location, etc. Logical storage segments of storage nodes located on the same rack/chassis may not be adjacent on the circular ordering. The storage system may operate in a performance mode in which a logical storage segment from each of the storage nodes is included in the circular ordering. In the event a storage node includes a plurality of logical storage segments, one of the plurality of logical storage segments is selected and included in the circular ordering and the one or more non-selected logical storage segments of the storage node are excluded from the circular ordering. The plurality of logical storage segments that store copies of a bucket comprised of a plurality of key-value pairs are selected based on the circular ordering and the fault tolerance policy. The fault tolerance policy may require that copies of key-value pairs are stored in a threshold number of adjacent logical storage segments. The fault tolerance policy may require that copies of buckets are stored in a threshold number of adjacent logical storage segments. In some embodiments, the circular ordering for the plurality of logical storage segments is randomly determined. In some embodiments, the circular ordering for the plurality of logical storage segments is determined based on a physical location of the storage nodes that include the plurality of logical storage segments.

At 406, a distributed and replicated data store is provided. The distributed and replicated data store is comprised of a plurality of buckets, each bucket is comprised of a plurality of key-value pairs. A storage node may be comprised of a plurality of logical storage segments. One of the plurality of logical storage segments is selected and used to provide the distributed and replicated data store. The one or more non-selected (unused) logical storage segments are excluded from being used to provide the distributed and replicated data store.

For each bucket, an initial logical storage segment is selected to store a first copy of a bucket comprised of a plurality of key-value pairs. The number of copies for a key-value pair is determined based on the fault tolerance policy. The number of copies of a bucket is also determined based on the fault tolerance policy. The one or more other logical storage segments to which the bucket comprised of the plurality of key-value pairs is replicated depends on the circular ordering. The one or more other logical storage segments are identified and the bucket comprised of the plurality of key-value pairs is replicated to one or more other logical storage segments of the storage system. The initial logical storage segment for each bucket may be different.

At 408, an available storage capacity metric associated with the logical storage segments is determined to meet a first threshold. In some embodiments, each of the logical storage segments of the storage system has an associated available storage capacity metric. For example, the available storage capacity metric may be a percentage of the logical storage segment that is used. The available storage capacity metric may be a total amount of data stored by a logical storage segment.

In some embodiments, the plurality of used online logical storage segments of the storage system, in combination, has an associated available storage capacity metric. For example, the available storage capacity metric may be a percentage of all of the online and used logical storage segments that is used. The available storage capacity metric may be a total amount of data stored by the online and used logical storage segments.

In some embodiments, the plurality of all logical storage segments (online and offline) used in performance mode in combination, has an associated available storage capacity metric. For example, the available storage capacity metric may be a percentage of all of the logical storage segments used in performance mode that is used. The available storage capacity metric may be a total amount of data stored by all of the logical storage segments used in performance mode.

At 410, one or more unused logical storage segments are dynamically deployed in providing the distributed and replicated data store. The one or more unused logical storage segments may be deployed in a manner that maintains the fault tolerance policy associated with the storage system. The fault tolerance policy may require that copies of a key-value pairs cannot be stored in logical storage segments that are located on the same storage node. The fault tolerance policy may require that copies of a bucket cannot be stored in logical storage segments that are located on the same storage node. The circular ordering for the plurality of logical storage segments is adjusted to accommodate the one or more unused logical storage segments. The logical storage segments of a single storage node may be located in the circular ordering such that they are not adjacent to each other. The logical storage segments of a single storage node may be located in the circular ordering based on the fault tolerance policy. For example, in the event X=3 or Y=3, there may be at least three logical storage segments in the circular ordering separating the plurality of logical storage segments of a single storage node.

After the adjusted circular ordering is determined, the buckets of the distributed and replicated data store may be rebalanced to maintain the fault tolerance policy of the storage system. A file manager of the storage system may select buckets to redistribute in a manner that minimizes the number of buckets that are redistributed.

Figure 5:
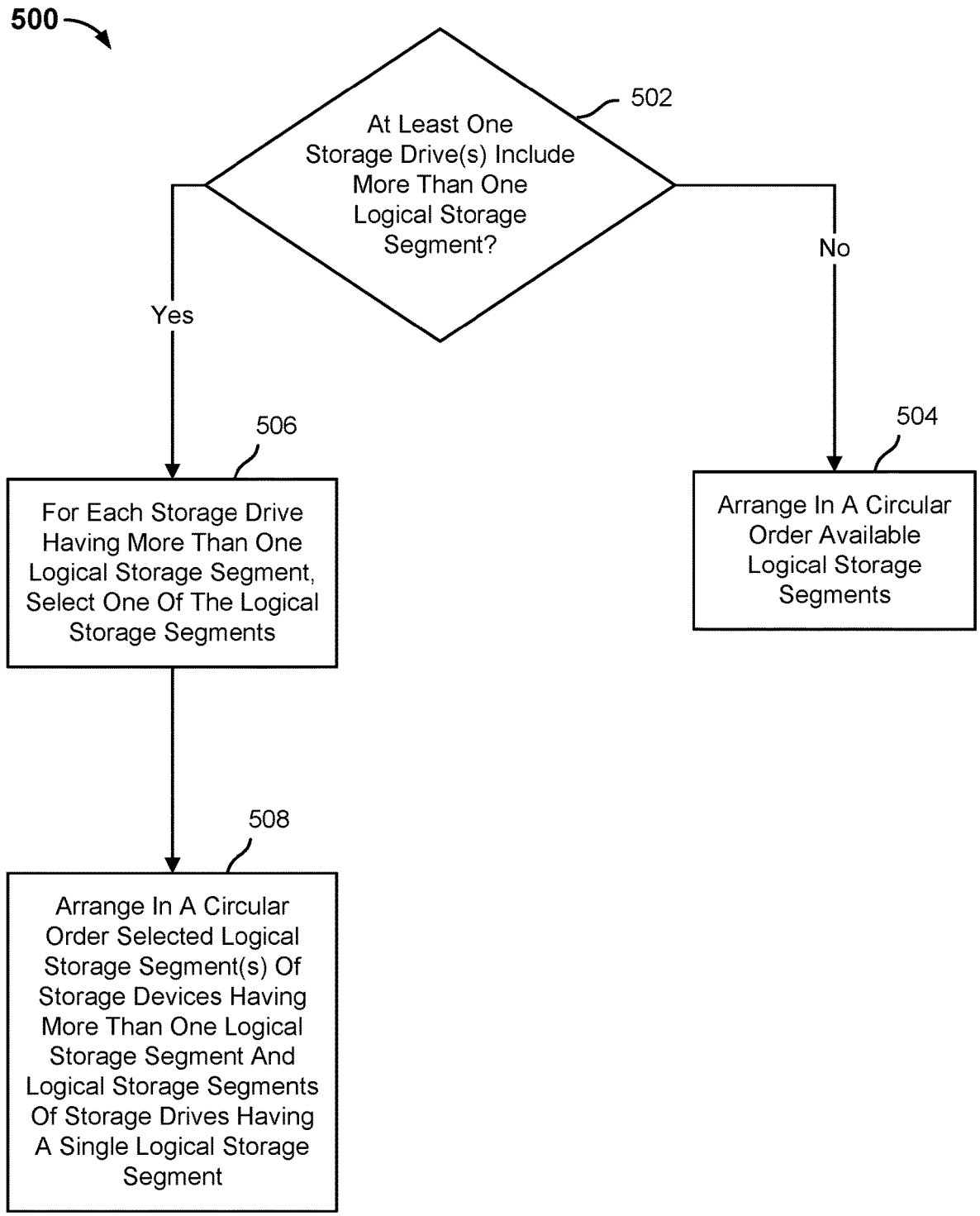
FIG. 5 is a flow chart illustrating an embodiment of a process for determining a circular ordering for a plurality of logical storage segments.

FIG. 5 is a flow chart illustrating an embodiment of a process for determining a circular ordering for a plurality of logical storage segments. In the example shown, process 500 may be implemented to perform some or all of step 404 of process 400. Process 500 may be implemented by a storage system, such as storage system 112.

At 502, it is determined whether at least one storage device includes more than one logical storage segment. The storage devices of a storage node may be allocated into one or more logical storage segments. In some embodiments, the storage node with the smallest storage capability is identified. The storage size of the identified storage node is determined to be the size of a logical storage segment for the plurality of storage nodes of the heterogeneous storage system. A storage node may be comprised of a plurality logical storage segments in the event the storage capacity of a storage node is greater than a multiple of the smallest storage capacity. In some embodiments, the logical storage size corresponds to a size that reduces the amount of unused storage capacity for the plurality of storage nodes within an unused storage capacity threshold. A storage node may be comprised of a plurality logical storage segments in the event the storage capacity of a storage node is greater than a multiple of the logical storage size corresponds to a size that reduces the amount of unused storage capacity for the plurality of storage nodes within an unused storage capacity threshold.

In the event it is determined that there is not at least one storage device that includes more than one logical storage segment, process 500 proceeds to 504. In the event it is determined that there is at least one storage device that includes more than one logical storage segment, process 500 proceeds to 506.

At 504, the available logical storage segments are arranged in a circular order. The available logical storage segments correspond to the logical storage segments of the plurality of storage nodes. At 506, for each storage device having more than one logical storage segment, one of the logical storage segments is selected. At 508, the one or more selected logical storage segments of storage devices having more than one logical storage segment and the logical storage segments of storage devices having a single logical storage segment are arranged in a circular order.

Figure 6:
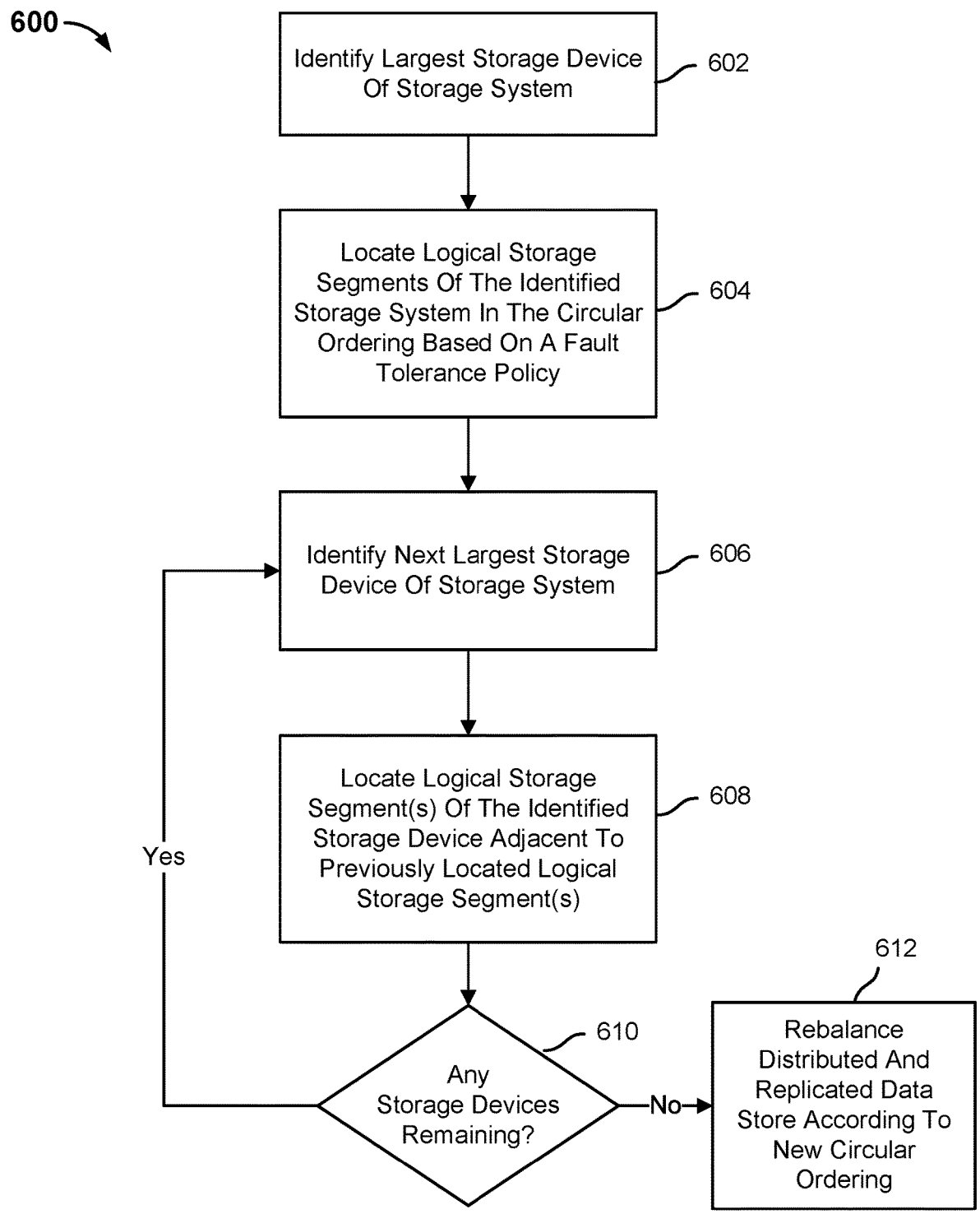
FIG. 6 is a flow chart illustrating an embodiment of a process for dynamically deploying unused logical storage segments in providing a distributed and replicated data store.

FIG. 6 is a flow chart illustrating an embodiment of a process for dynamically deploying unused logical storage segments in providing a distributed and replicated data store. In the example shown, process 600 may be implemented to perform some or all of step 410 of process 400. Process 600 may be implemented by a storage system, such as storage system 112.

At 602, a largest storage device of the storage system is identified. A storage system is comprised of a plurality of storage devices. Each storage device has a corresponding storage capacity. The storage device with the largest storage capacity is identified. The identified storage device is comprised of a plurality of logical storage segments.

At 604, logical storage segments of the identified storage system are located in the circular ordering based on a fault tolerance policy. The fault tolerance policy may require that copies of a key-value pair cannot be stored in logical storage segments that are located on the same storage node. The fault tolerance policy may require that copies of a bucket cannot be stored in logical storage segments that are located on the same storage node. The fault tolerance policy may require that copies of a key-value pair are stored in X logical storage segments that are adjacent based on the circular ordering. The logical storage segments of the identified storage system may be located in the circular ordering such that there are at least X logical storage segments between them.

At 606, a next largest storage device of the storage system is identified. The next largest storage device of the storage system may be comprised of one or more logical storage segments.

At 608, logical storage segment(s) of the identified storage drive are located adjacent to the previously located logical storage segment(s) in the circular ordering.

At 610, it is determined whether any storage devices are remaining. In the event there are no remaining storage devices, process 600 proceeds to 612. In the event there are remaining storage devices, process 600 returns to 606.

At 612, the distributed and replicated data store is rebalanced according to the new circular ordering. A file manager of the storage system may select buckets to redistribute in a manner that minimizes the number of buckets that are redistributed. For example, a bucket may be selected to be migrated to an added logical storage segment. The file manager may select any of the copies of the bucket to migrate, but depending on which copy is selected as described with respect to FIG. 3B, additional copies of the bucket may be required to also be migrated. The file manager may select a copy of a bucket that causes the least number of bucket migrations.

The buckets are rebalanced in a manner to be consistent with the fault tolerance policy. For example, the fault tolerance policy may require that three adjacent logical storage segments store a copy of a bucket comprised of a plurality of key-value pairs. One or more copies of a bucket may be replicated to one or more logical storage segments so that the distributed and replicated data store is consistent with the fault tolerance policy.

Figure 7:
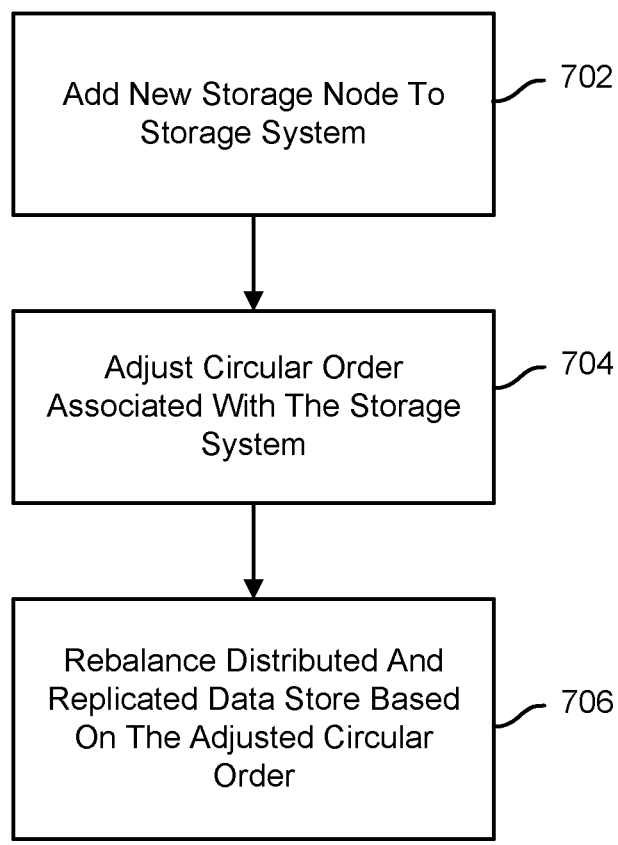
FIG. 7 is a flow chart illustrating an embodiment of a process for rebalancing a distributed and replicated data store.

FIG. 7 is a flow chart illustrating an embodiment of a process for rebalancing a distributed and replicated data store. In the example shown, process 700 may be implemented by storage system, such as storage system 112.

At 702, a new storage node is added to the storage system. In some embodiments, the new storage node is an additional storage node for the storage system. In some embodiments, the new storage node replaces an existing storage node for the storage system.

At 704, a circular order associated with the storage system is adjusted.

In some embodiments, the storage system is operating in a performance mode. A storage capacity of the new node is determined. The new storage node may be comprised of a plurality logical storage segments in the event the storage capacity of a storage node is greater than a multiple of the smallest storage capacity. In the event the new storage node is comprised of a single logical storage segment, the logical storage segment is added to the circular ordering. In the event the new storage node is comprised of a plurality of logical storage segments, one of the logical storage segments is selected and added to the circular ordering. The logical storage segment of the new storage node may be placed in a location of the circular order that minimizes the number of buckets that need to be redistributed to it.

In some embodiments, the storage system is operating in a space mode. A storage capacity of the new node is determined. The new storage node may be comprised of a plurality logical storage segments in the event the storage capacity of a storage node is greater than a multiple of the smallest storage capacity. In the event the new storage node is comprised of a plurality of logical storage segment, the plurality of logical storage segments are added to the circular ordering as described above.

In some embodiments, adding a new logical storage segment to the storage system causes the storage system to change from operating in a space mode to operating in a performance mode.

In some embodiments, in the event a new storage node replaces an existing storage node for the storage system, the new storage node replaces the existing storage node's place in the circular ordering.

At 706, a distributed and replicated data store is rebalanced based on the adjusted circular order. A file manager of the storage system may select buckets to redistribute in a manner that minimizes the number of buckets that are redistributed. A file manager of the storage system may determine for each bucket, how many redistributions would be needed to be performed in the event the bucket is redistributed to the new logical storage segment. For example, redistributing a first copy of a bucket to the new logical storage segment may cause a redistribution of a second copy of the bucket to another logical storage segment (e.g., two redistributions), but redistributing a third copy of the bucket to the new logical storage segment may not cause other copies of the bucket to be redistributed (e.g., one redistribution).

In some embodiments, logical storage segments with an available storage capacity metric above a second threshold (second threshold is less than the first threshold) may offload one or more buckets to the new logical storage segment.

In some embodiments, in the event a new storage node replaces an existing storage node for the storage system, the buckets stored by the replaced storage node are copied to the new storage node.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
providing a distributed and replicated data store associated with a storage system using a circular order for a portion of a plurality of logical storage segments that at least includes a first logical storage segment of a first storage node and a second logical storage segment of a second storage node, wherein the first logical storage segment of the first storage node and the second logical storage segment of the second storage node are adjacent to each other in the circular order, wherein a fault tolerance policy indicates a threshold number of adjacent logical storage segments of the plurality of logical storage segments needed to store a copy of a bucket, wherein the fault tolerance policy is at least in part satisfied by having the first logical storage segment of the first storage node store a first copy of a first bucket and the second logical storage segment of the second storage node store a second copy of the first bucket;
adding a new storage node to the storage system;
determining a number count of logical storage segments associated with the new storage node;
adjusting the circular order associated with the storage system based on the determined number count of logical storage segments associated with the new storage node, wherein in the adjusted circular order associated with the storage system, a logical storage segment of the new storage node is located in between the first logical storage segment of the first storage node and the second logical storage segment of the second storage node; and
rebalancing the distributed and replicated data store based on the adjusted circular order including by migrating the first copy of the first bucket from the first logical storage segment of the first storage node or the second copy of the first bucket from the second logical storage segment of the second storage node to the logical storage segment associated with the new storage node to satisfy the fault tolerance policy.

2. The method of claim 1, wherein the new storage node is an additional storage node associated with the storage system.

3. The method of claim 1, wherein the new storage node replaces an existing node associated with the storage system.

4. The method of claim 3, wherein the new storage node replaces the existing node associated with the storage system in the circular order.

5. The method of claim 1, wherein determining the number count of logical storage segments associated with the new storage node includes determining a storage capacity of the new storage node.

6. The method of claim 5, wherein the determined number count of logical storage segments associated with the new storage node is based on whether the determined storage capacity of the new storage node is greater than a multiple of a smallest storage capacity of a plurality of storage nodes of the storage system.

7. The method of claim 6, wherein a single logical storage segment associated with the new storage node is included in the adjusted circular order in response to a determination that the determined storage capacity of the new storage node is not greater than the multiple of the smallest storage capacity of the plurality of storage nodes of the storage system.

8. The method of claim 7, wherein the single logical storage segment associated with the new storage node is located in the adjusted circular order based on a number count of bucket redistributions associated with locating the single logical storage segment at a particular location in the adjusted circular order.

9. The method of claim 6, wherein a third logical storage segment of the plurality of logical storage segments associated with the new storage node is included in the adjusted circular order in response to a determination that the determined storage capacity of the new storage node is greater than the multiple of the smallest storage capacity of the plurality of storage nodes of the storage system.

10. The method of claim 9, wherein the third logical storage segment associated with the new storage node is located in the adjusted circular order based on a number of bucket redistributions associated with locating the third logical storage segment at a particular location in the adjusted circular order.

11. The method of claim 1, wherein rebalancing the distributed and replicated data store based on the adjusted circular order includes determining an available storage capacity metric associated with the first logical storage segment.

12. The method of claim 11, wherein rebalancing the distributed and replicated data store based on the adjusted circular order further includes migrating one or more buckets of key-value pairs from the first logical storage segment to a third logical storage segment associated with the new storage node in response to determining that the available storage capacity associated with the first logical storage segment is less than a first threshold and greater than a second threshold.

13. The method of claim 11, wherein rebalancing the distributed and replicated data store based on the adjusted circular order further includes copying one or more buckets of key-value pairs from the first logical storage segment to a third logical storage segment associated with the new storage node in response to determining that the available storage capacity associated with the first logical storage segment is less than a first threshold and greater than a second threshold.

14. The method of claim 11, wherein the available storage capacity metric associated with the plurality of logical storage segments is a percentage of the plurality of logical storage segments that is used or a total amount of data stored by the plurality of logical storage segments.

15. The method of claim 1, wherein the distributed and replicated data store is comprised of a plurality of buckets, wherein each of the plurality of buckets is comprised of a plurality of key-value pairs.

16. The method of claim 15, wherein the distributed and replicated data store is comprised of a plurality of copies of the buckets.

17. The method of claim 16, wherein the plurality of copies of the buckets are stored in adjacent logical storage segments according to the circular order of the portion of the plurality of logical storage segments.

18. A computer program product, the computer program product being embodied in a tangible non-transitory computer readable storage medium and comprising computer instructions for:
  providing a distributed and replicated data store associated with a storage system using a circular order for a portion of a plurality of logical storage segments that at least includes a first logical storage segment of a first storage node and a second logical storage segment of a second storage node, wherein the first logical storage segment of the first storage node and the second logical storage segment of the second storage node are adjacent to each other in the circular order, wherein a fault tolerance policy indicates a threshold number of adjacent logical storage segments of the plurality of logical storage segments needed to store a copy of a bucket, wherein the fault tolerance policy is at least in part satisfied by having the first logical storage segment of the first storage node store a first copy of a first bucket and the second logical storage segment of the second storage node store a second copy of the first bucket;
  adding a new storage node to the storage system;
  determining a number count of logical storage segments associated with the new storage node;
  adjusting the circular order associated with the storage system based on the determined number count of logical storage segments associated with the new storage node, wherein in the adjusted circular order associated with the storage system, a logical storage segment of the new storage node is located in between the first logical storage segment of the first storage node and the second logical storage segment of the second storage node; and
  rebalancing the distributed and replicated data store based on the adjusted circular order including by migrating the first copy of the first bucket from the first logical storage segment of the first storage node or the second copy of the first bucket from the second logical storage segment of the second storage node to the logical storage segment associated with the new storage node to satisfy the fault tolerance policy.

19. The computer program product of claim 18, wherein the distributed and replicated data store is comprised of a plurality of buckets, wherein each of the plurality of buckets is comprised of a plurality of key-value pairs.

20. A system, comprising:
  a processor; and
  a memory coupled with the processor, wherein the memory is configured to provide the processor with instructions which when executed cause the processor to:
    provide a distributed and replicated data store associated with a storage system using a circular order for a portion of a plurality of logical storage segments that at least includes a first logical storage segment of a first storage node and a second logical storage segment of a second storage node, wherein the first logical storage segment of the first storage node and the second logical storage segment of the second storage node are adjacent to each other in the circular order, wherein a fault tolerance policy indicates a threshold number of adjacent logical storage segments of the plurality of logical storage segments needed to store a copy of a bucket, wherein the fault tolerance policy is at least in part satisfied by having the first logical storage segment of the first storage node store a first copy of a first bucket and the second logical storage segment of the second storage node store a second copy of the first bucket;
    add a new storage node to the storage system;
    determine a number count of logical storage segments associated with the new storage node;
    adjust the circular order associated with the storage system based on the determined number count of logical storage segments associated with the new storage node, wherein in the adjusted circular order associated with the storage system, a logical storage segment of the new storage node is located in between the first logical storage segment of the first storage node and the second logical storage segment of the second storage node; and
    rebalance the distributed and replicated data store based on the adjusted circular order including by migrating the first copy of the first bucket from the first logical storage segment of the first storage node or the second copy of the first bucket from the second logical storage segment of the second storage node to the logical storage segment associated with the new storage node to satisfy the fault tolerance policy.

* * * * *